US009313411B2

(12) United States Patent
Morimura

(10) Patent No.: US 9,313,411 B2
(45) Date of Patent: Apr. 12, 2016

(54) CAMERA, DISTORTION CORRECTION DEVICE AND DISTORTION CORRECTION METHOD

(75) Inventor: Atsushi Morimura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 66 days.

(21) Appl. No.: 13/995,201

(22) PCT Filed: Dec. 22, 2011

(86) PCT No.: PCT/JP2011/007215
§ 371 (c)(1),
(2), (4) Date: Jun. 18, 2013

(87) PCT Pub. No.: WO2012/093453
PCT Pub. Date: Jul. 12, 2012

(65) Prior Publication Data
US 2013/0265468 A1 Oct. 10, 2013

(30) Foreign Application Priority Data

Jan. 6, 2011 (JP) ................... 2011-001125

(51) Int. Cl.
H04N 5/217 (2011.01)
H04N 5/232 (2006.01)
G06T 3/00 (2006.01)
(Continued)

(52) U.S. Cl.
CPC .......... H04N 5/23296 (2013.01); G06T 3/0062 (2013.01); G06T 5/006 (2013.01); H04N 5/23238 (2013.01); H04N 5/3572 (2013.01)

(58) Field of Classification Search
CPC ....................................................... H04N 3/23
See application file for complete search history.

(56) References Cited

U.S. PATENT DOCUMENTS 5,185,667 A * 2/1993 Zimmermann ....... G06T 3/0018
348/143
7,944,487 B2 * 5/2011 Takane ................... H04N 5/217
348/241

(Continued)

FOREIGN PATENT DOCUMENTS

CN 1822660 8/2006
CN 101738711 6/2010

(Continued)

OTHER PUBLICATIONS

English Translation of Search Report annexed to Office Action in Chinese Application No. 201180064351.3, dated Oct. 14, 2015.

Primary Examiner — Twyler Haskins
Assistant Examiner — Wesley J Chiu
(74) Attorney, Agent, or Firm — Greenblum & Bernstein, P.L.C.

(57) ABSTRACT

An electronic zoom and distortion correction processing unit (104) performs electronic zooming and distortion correction of a distorted image by re-mapping the pixels of the distorted image. In accordance with a specified electronic zoom factor (S1), a re-mapping control unit (110) controls re-mapping by the electronic zoom and distortion correction processing unit (104) such that the correction factor (S4) of the distortion correction processing is changed in addition to the electronic zoom factor of the electronic zoom processing. By this means, the correction factor (S4) is changed in accordance with the specified electronic zoom factor (S1), and distorted images can be appropriately corrected while preventing denaturing of the images.

19 Claims, 7 Drawing Sheets

(51) Int. Cl.
*G06T 5/00* (2006.01)
*H04N 5/357* (2011.01)

(56) References Cited

U.S. PATENT DOCUMENTS

| | | | |
|---|---|---|---|
| 7,949,202 B2 | 5/2011 | Matsuda | |
| 8,085,320 B1* | 12/2011 | Khan et al. | 348/241 |
| 8,098,954 B2* | 1/2012 | Hara | 382/275 |
| 8,218,247 B2 | 7/2012 | Kuroda et al. | |
| 8,335,398 B2* | 12/2012 | Omori | 382/275 |
| 8,792,039 B2* | 7/2014 | Hirooka et al. | 348/333.03 |
| 2004/0001152 A1* | 1/2004 | Funamoto | 348/222.1 |
| 2004/0017491 A1* | 1/2004 | Stavely | 348/240.2 |
| 2006/0181687 A1 | 8/2006 | Matsuda | |
| 2008/0137980 A1* | 6/2008 | Mizuno | 382/255 |
| 2009/0128686 A1 | 5/2009 | Yamashita et al. | |
| 2010/0097481 A1* | 4/2010 | Taoka | 348/208.13 |
| 2010/0110277 A1* | 5/2010 | Shibuno et al. | 348/360 |
| 2010/0123959 A1 | 5/2010 | Kuroda et al. | |
| 2010/0271539 A1* | 10/2010 | Ohtsuka | H04N 5/2252 348/373 |
| 2012/0051666 A1* | 3/2012 | Minakawa | G06T 3/0062 382/295 |

FOREIGN PATENT DOCUMENTS

| | | | |
|---|---|---|---|
| JP | 3051173 | 3/1991 | |
| JP | 06-237412 | 8/1994 | |
| JP | 2004-199350 | 7/2004 | |
| JP | 2006-227774 | 8/2006 | |
| JP | 2008-227996 | 9/2008 | |
| JP | 2009-124627 | 6/2009 | |
| JP | 2010-171503 | 8/2010 | |
| WO | WO 2010084731 A1 * | 7/2010 | H04N 5/232 |

\* cited by examiner

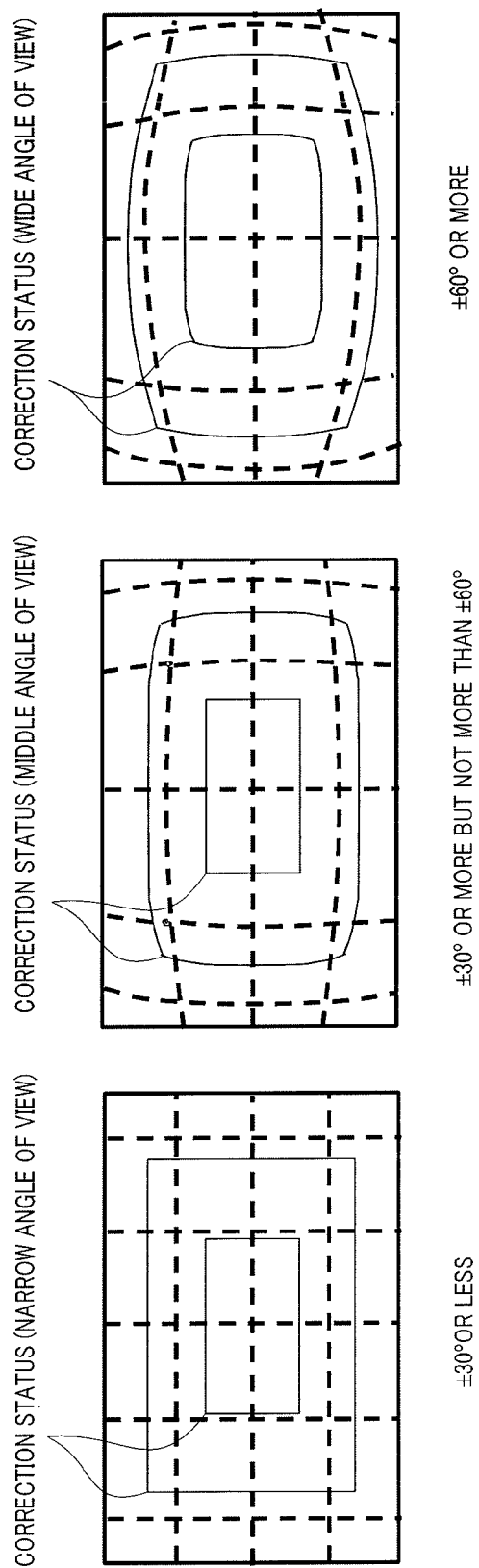

CAMERA, DISTORTION CORRECTION DEVICE AND DISTORTION CORRECTION METHOD

TECHNICAL FIELD

The present invention relates to a camera, a distortion correction apparatus, and a distortion correction method for correcting a distorted image captured by using a wide-angle lens such as a fisheye lens.

BACKGROUND ART

In general, an image captured by using a wide-angle lens such as a fisheye lens is likely to have larger distortion in a peripheral portion of the image.

FIGS. 1A and 1B illustrate how distortion is corrected in the related art. FIGS. 1A and 1B illustrate an image of a black and white parallel stripe pattern captured by using a wide-angle lens. FIG. 1A illustrates an image before distortion is corrected. It can be seen that the peripheral portion of the image has larger distortion due to optical distortion. FIG. 1B illustrates an image after the distortion is corrected. The distortion in the peripheral portion is removed in the image illustrated in FIG. 1B, but the corrected image becomes unnatural due to magnification of the peripheral portion.

In this respect, there have been proposed a large number of distortion correction techniques for acquiring an image having as natural-looking as possible while correcting distortion.

For example, Patent Literature (hereinafter, abbreviated as PTL) 1 discloses a technique that performs distortion correction so as to acquire natural appearance by using a combination of a function for performing distortion correction and a function for not performing distortion correction.

In addition, PTL 2 discloses a technique that performs distortion correction so as to acquire natural appearance by setting a magnification ratio (conversion function) according to coordinates (X-axis and Y-axis values) of an image cut out from a distorted image, and that performs image conversion by using the magnification ratio.

CITATION LIST

Patent Literature

PTL 1
Japanese Patent Application Laid-Open No. 2004-199350
PTL 2
Japanese Patent Application Laid-Open No. 2009-124627
PTL 3
Japanese Patent No. 3051173

SUMMARY OF INVENTION

Technical Problem

Recent cameras are generally provided with an electronic zooming process function. However, a relation between the electronic zooming and the distortion correction has not been sufficiently studied.

The present invention is implemented by sufficiently studying a relation between an electronic zooming process and a distortion correction process. It is an object of the present invention to provide a camera, a distortion correction apparatus, and a distortion correction method capable of appropriately correcting a distorted image while preventing the image from becoming unnatural when both the electronic zooming process and the distortion correction process are performed on the distorted image captured by using a wide-angle lens.

Solution to Problem

A camera according to an aspect of the present invention includes: a lens that forms an image of a subject; an imaging sensor that acquires a captured image signal by converting an optical image formed by the lens into an electrical signal; and an electronic zoom and distortion correction processing section that performs an electronic zooming process and a distortion correction process on the captured image signal, in which the electronic zoom and distortion correction processing section changes not only an electronic zoom magnification ratio of the electronic zooming process but also a correction factor of the distortion correction process in accordance with a designated electronic zoom magnification ratio.

A distortion correction apparatus according to an aspect of the present invention includes: an electronic zoom and distortion correction processing section that performs an electronic zooming process and a distortion correction process on a distorted image by remapping pixels of the distorted image; and a remapping control section that controls the remapping performed by the electronic zoom and distortion correction processing section in a way that changes not only an electronic zoom magnification ratio of the electronic zooming process but also a correction factor of the distortion correction process in accordance with a designated electronic zoom magnification ratio.

Advantageous Effects of Invention

According to the present invention, it is possible to appropriately correct a distorted image while preventing the image from becoming unnatural when both the electronic zooming process and the distortion correction are performed on the distorted image generated by using a wide-angle lens.

BRIEF DESCRIPTION OF DRAWINGS

FIG. 1A is a diagram illustrating an image before distortion is corrected, and FIG. 1B is a diagram illustrating an image after the distortion is corrected;

FIG. 4A is a diagram illustrating a table used in a case where a lens angle of view is 120°, FIG. 4B is a diagram illustrating a table used in a case where the lens angle of view is 140°, and FIG. 4C is a diagram illustrating a table used in a case where the lens angle of view is 180°;

FIGS. 6A to 6C are diagrams illustrating display examples of a shape with correction status and correction results, FIG. 6A is a diagram illustrating a display image in a case where an electronic zoom angle of view is ±30° or less, FIG. 6B is a diagram illustrating a display image in a case where the electronic zoom angle of view is ±30° or more but not more than ±60°, and FIG. 6C is a diagram illustrating a display image in a case where the electronic zoom angle of view is ±60° or more.

DESCRIPTION OF EMBODIMENTS

Hereinafter, an embodiment of the present invention will be described in detail with reference to the accompanying drawings.

Figure 2:
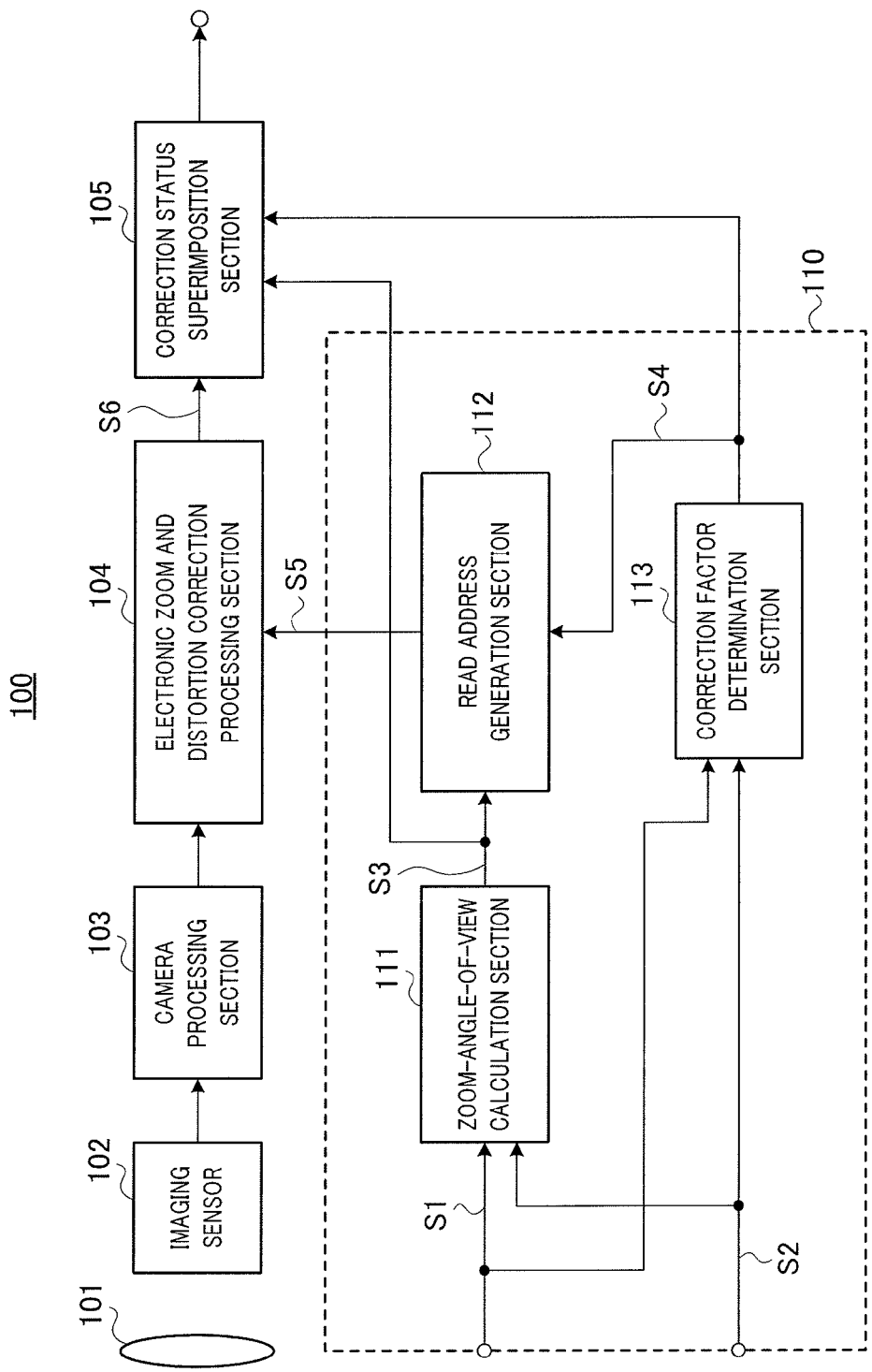
FIG. 2 is a block diagram illustrating a configuration of a camera according to an embodiment.

FIG. 2 illustrates a configuration of a camera according to the embodiment. Camera 100 is, for example, a so-called wide-angle camera such as a surveillance camera and is configured to perform a distortion correction process on a captured distorted image. In addition, camera 100 has an electronic zooming function.

Camera 100 includes wide-angle lens 101 such as a fisheye lens and is thus configured to form a subject image in imaging sensor 102 by wide-angle lens 101. Imaging sensor 102 includes a CCD or the like and is configured to acquire a captured image signal by converting the formed optical image into an electrical signal. Camera processing section 103 performs a γ process, a matrix process, and the like on the captured image signal outputted from imaging sensor 102 and outputs a processed signal to electronic zoom and distortion correction processing section 104.

Electronic zoom and distortion correction processing section 104 includes an image memory and an interpolation circuit, for example. Remapping control section 110 to be described hereinafter controls reading from the image memory and interpolation. As a result, pixel positions or image signals are remapped, realizing the electronic zooming process and the distortion correction process.

Remapping control section 110 controls the remapping performed by electronic zoom and distortion correction processing section 104. Remapping control section 110 receives electronic zoom magnification ratio S1 and lens angle of view S2, which are designated by a user, as input. Electronic zoom magnification ratio S1 is designated by the user through an operation section (not illustrated), for example. Lens angle of view S2 is a lens angle of view of wide-angle lens 101. Lens angle of view S2 is stored in a memory (not illustrated). In a case where a wide-angle lens having a constant lens angle of view is used, the lens angle of view S2 has a fixed value. However, in a case where a wide-angle lens having a variable lens angle of view is used or a wide-angle lens (zoom lens) is replaced, the lens angle of view S2 is changed accordingly.

Zoom-angle-of-view calculation section 111 receives electronic zoom magnification ratio S1 and lens angle of view S2 as input. Zoom-angle-of-view calculation section 111 calculates electronic zoom angle of view S3, which is an angle of view after the electronic zooming, based on electronic zoom magnification ratio S1 and lens angle of view S2 and outputs the electronic zoom angle of view S3 to read address generation section 112.

Figure 3:
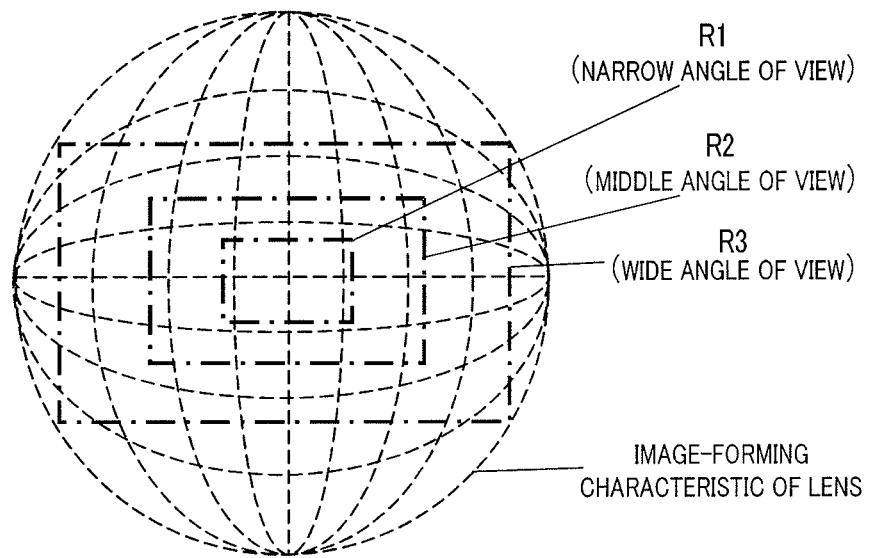
FIG. 3 is a diagram illustrating image-forming characteristics of a lens and an electronic zoom angle of view in a case where a wide-angle lens is used.

FIG. 3 illustrates image-forming characteristics of a lens and an electronic zoom angle of view in a case where the wide-angle lens is used. In this drawing, a dot line indicates an image-forming characteristic of the lens. As the lens angle of view is changed, the image-forming characteristics of the lens indicated by the dot line in this drawing are changed, accordingly. In this drawing, a dotted dashed line indicates an electronic zoom angle of view. Apparently, the size of the electronic zoom angle of view is changed in accordance with the lens angle of view and the electronic zoom magnification ratio.

It is assumed that the electronic zoom magnification ratios are Z1, Z2, and Z3, where Z1>Z2>Z3. In a case where electronic zoom magnification ratio Z1, which has the largest value, is designated, the image display range corresponding to the narrow angle of view indicated by R1 in this drawing is cut, and image display range R1 is displayed with being magnified by the amount corresponding to electronic zoom magnification ratio Z1. In addition, in a case where electronic zoom magnification ratio Z2, which has a middle value, is designated, the image display range corresponding to the middle angle of view indicated by R2 in this drawing is cut, and image display range R2 is displayed with being magnified by the amount corresponding to electronic zoom magnification ratio Z2. In a case where electronic zoom magnification ratio Z3, which has the lowest value, is designated, the image display range corresponding to the wide angle of view indicated by R3 in this drawing is cut, and image display range R3 is displayed with being magnified by electronic zoom magnification ratio Z3 (when electronic zoom magnification ratio Z3 is one, image display range R3 is displayed without any magnification).

Correction factor determination section 113 determines correction factor S4 based on electronic zoom magnification ratio S1 and the lens angle of view S2 and outputs correction factor S4 to read address generation section 112.

Figure 4A:
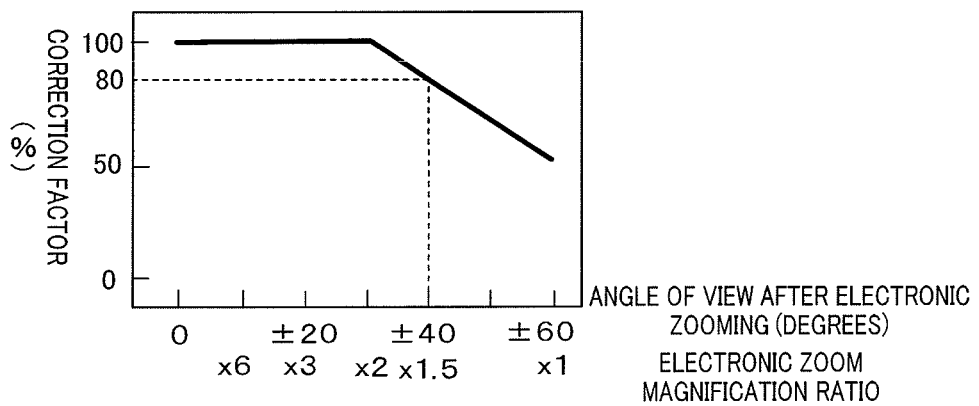
FIGS. 4A to 4C are diagrams illustrating tables for obtaining correction factors corresponding to electronic zoom magnification ratios.
Figure 4B:
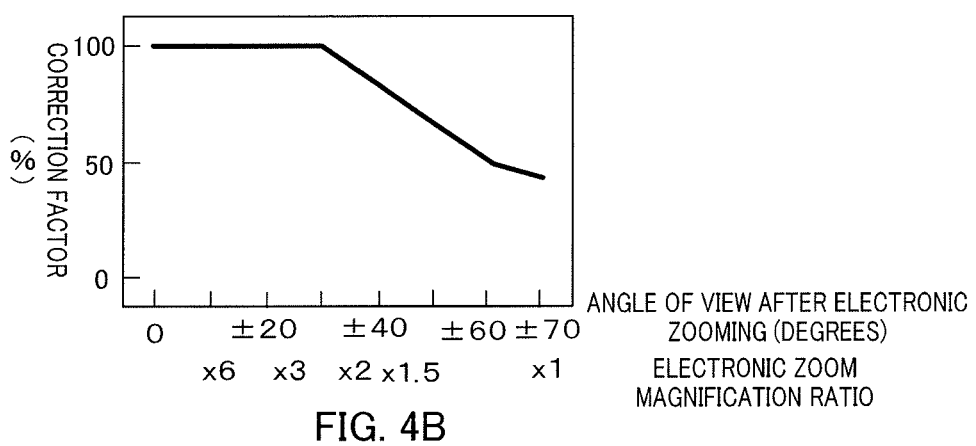
Figure 4C:
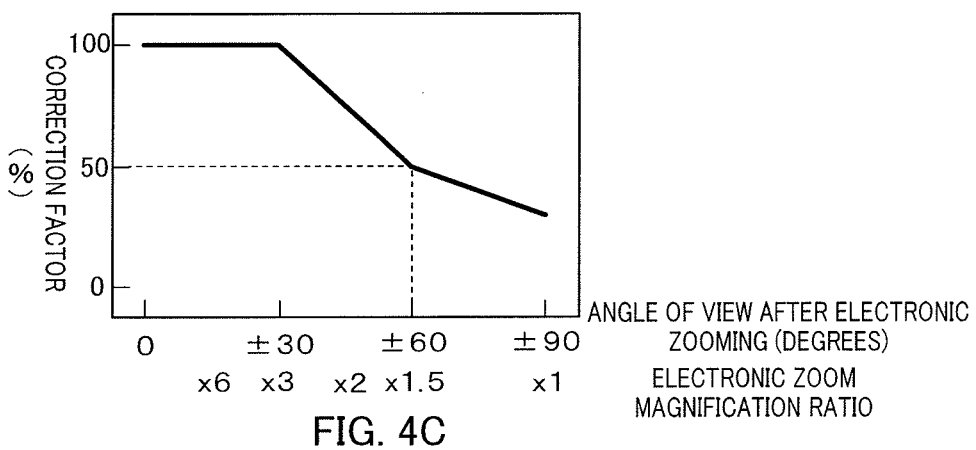

In the case of the present embodiment, as illustrated in FIGS. 4A, 4B, and 4C, correction factor determination section 113 includes a plurality of tables corresponding to the lens angles of view S2 and determines correction factors S4 by using the tables corresponding to the lens angles of view S2 to be received as input, from among the plurality of tables and outputs correction factors S4.

As an example, FIGS. 4A to 4C illustrate three tables, respectively: a table used when the lens angle of view is 120° (indicated as ±60° in this drawing) (FIG. 4A); a table used when the lens angle of view is 140° (indicated as ±70° in this drawing) (FIG. 4B); and a table used when the lens angle of view is 180° (indicated as ±90° in this drawing) (FIG. 4C). However, more tables may be used in accordance with the lens angles of view. In addition, if there is no table corresponding to a certain lens angle of view in the prepared tables, the table corresponding to a lens angle of view closest to the certain lens angle of view may be used as a substitute.

When the lens angle of view S2 is 120°, correction factor determination section 113 outputs correction factor S4 corresponding to electronic zoom magnification ratio S1 with reference to the table illustrated in FIG. 4A. In addition, when the lens angle of view S2 is 140°, correction factor determination section 113 outputs correction factor S4 corresponding to electronic zoom magnification ratio S1 with reference to the table illustrated in FIG. 4B. In addition, when the lens angle of view S2 is 180°, correction factor determination section 113 outputs correction factor S4 corresponding to electronic zoom magnification ratio S1 with reference to the table illustrated in FIG. 4C. If the lens angle of view S2 is determined, the relation between electronic zoom magnification ratio S1 and the angle of view after electronic zooming (electronic zoom angle of view) is uniquely determined. Therefore, in each drawing, both of the electronic zoom magnification ratio, and the angle of view after electronic zooming are represented on the horizontal axis.

Figure 5:
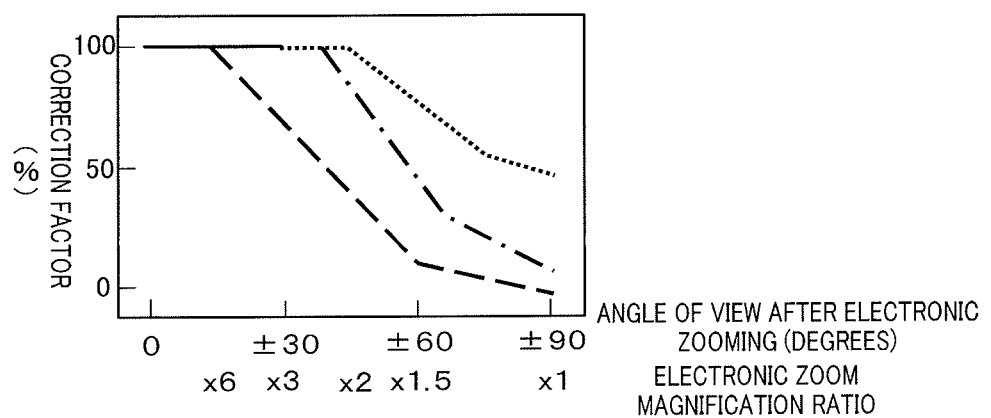
FIG. 5 is a diagram illustrating an example where a plurality of correspondence tables between correction factors and electronic zoom magnification ratios with respect to the same lens angle of view are prepared.

In addition, in some cases, distortion characteristics may be different depending on the characteristics of the lens even for the same lens angle of view S2, as illustrated in FIG. 5.

Therefore, even for the same lens angle of view, a plurality of the correspondence tables of the correction factor to the electronic zoom magnification ratio may be prepared.

Figure 1A:
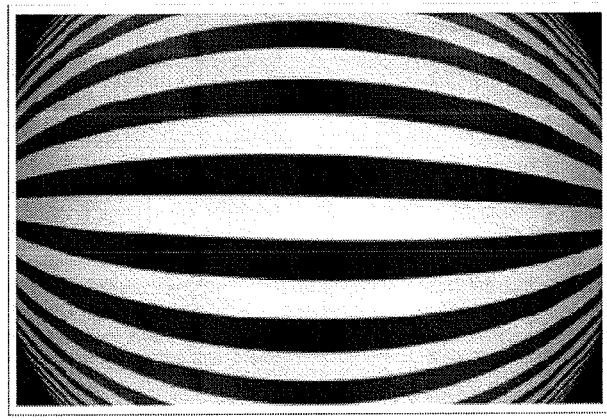
FIGS. 1A and 1B are diagrams illustrating how distortion is corrected in the related art.
Figure 1B:
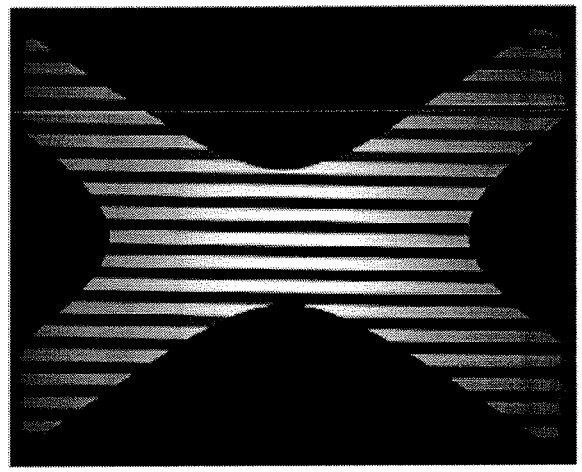

Read address generation section 112, first, generates a read address for forming an image of electronic zoom angle of view S3 without any distortion based on the electronic zoom angle of view S3 received as input. The technique for generating the read address is well-known as disclosed in PTL 3, for example, and thus, the detailed description will not be provided herein. To put it simply, a read address for forming an image where distortion is completely corrected as illustrated in FIG. 1B is generated with respect to the distorted image illustrated in FIG. 1A.

Next, read address generation section 112 changes the read address for performing the complete distortion correction to a read address for performing distortion correction with only the amount corresponding to correction factor S4 determined by correction factor determination section 113 and outputs read address S5 resulting from the change, as the read address of electronic zoom and distortion correction processing section 104. Correction factor S4 is defined by equation 1. Correction factor S4 is defined with reference to perspective projection where a square is output as a square. Image height Y' after the correction is obtained by equation 2 based on equation 1. Correction factors S4 are illustrated in the graphs of FIGS. 4A to 4C and FIG. 5, and image height Y' to be outputted is obtained based on equation 2. In addition, although the read address for forming an image without any distortion is generated first and then changed to another in accordance with the correction factor in this embodiment for the purpose of better understanding of the correction factor, in an actual case, read address S5 corresponding to the correction factor may be generated without generating the read address first.

$$S4=1-(Y0-Y')/(Y0-Yn) \quad \text{(Equation 1)}$$

$$Y'=Y0-(1-S4)(Y0-Yn) \quad \text{(Equation 2)}$$

where, $Y0=f \tan \theta$ (perspective projection)

$Yn=f\theta$ (equidistance projection), $Yn=f \sin \theta$ (orthogonal projection), for example, and characteristics of wide-angle lens in use are:

Y0: image height as a reference; perspective projection is used

Yn: image height of lens in use

Y': image height after correction $\theta$: viewing angle used as a reference; determined in a range of about 45° to about 70°, and f: focal length of lens in use.

For example, when wide-angle lens 101 having the lens angle of view S2 equal to 120° (±60°) is used and designated electronic zoom magnification ratio S1 corresponds to 1.5×, correction factor determination section 113 uses the table illustrated in FIG. 4A and outputs correction factor S4 of 80%. Read address generation section 112 generates and outputs read address S5 for performing 80% distortion correction rather than the read address for performing the complete distortion correction. As a matter of course, read address S5 to be outputted herein corresponds to 1.5× electronic zooming.

In addition, for example, when wide-angle lens 101 having the lens angle of view S2 equal to 180° (±90°) is used and designated electronic zoom magnification ratio S1 corresponds to 1.5×, correction factor determination section 113 uses the table illustrated in FIG. 4C and outputs correction factor S4 of 50%. Read address generation section 112 generates and outputs read address S5 for performing 50% distortion correction rather than the read address for performing the complete distortion correction. Apparently, read address S5 to be outputted herein corresponds to 1.5× electronic zooming.

Electronic zoom and distortion correction processing section 104 performs remapping and interpolation of pixels according to read address S5 to generate image signal S6 on which the electronic zooming process and the distortion correction process have been performed, and outputs image signal S6 to correction status superimposition section 105.

In addition to image signal S6 on which the electronic zooming process and the distortion correction process have been performed, the electronic zoom angle of view S3 and correction factor S4 are inputted to correction status superimposition section 105. Correction status superimposition section 105 produces a shape representing a correction status based on the electronic zoom angle of view S3 and correction factor S4 and superimposes the shape on image signal S6. Accordingly, a viewer can check how much distortion correction is made on the displayed image. Particularly, since distortion correction factor S4 is changed according to designated electronic zoom magnification ratio S1 in the embodiment, it is very effective to display the shape representing the correction status.

FIGS. 6A to 6C illustrate display examples of shapes representing a correction status. In these drawings, dot lines schematically indicate a distortion status. In these drawings, solid lines indicate shapes representing a correction status. In the examples illustrated in FIGS. 6A to 6C, wide-angle lens 101 having the lens angle of view of 180° (±90°) is used (see FIG. 4C).

FIG. 6A illustrates a display image when the electronic zoom angle of view is ±30° (60°) or less. In this case, as can be seen from FIG. 4C, the complete distortion correction (distortion correction with the correction factor of 100%) is performed, so that a rectangular shape indicating that no distortion remains is displayed as the shape representing the correction status. FIG. 6C illustrates a display image when the electronic zoom angle of view is ±60° (120°) or more. In this case, as can be seen from FIG. 4C, the distortion correction with the correction factor of 50% or less is performed, so that a shape of a barrel indicating that some degrees of distortion remain is displayed as the shape representing the correction status. FIG. 6B illustrates a display image when the electronic zoom angle of view is ±30° (60°) or more but not more than ±60° (120°). In this case, an intermediate shape between the shapes illustrated in FIGS. 6A and 6C is displayed as the shape representing the correction status.

In addition, in the examples illustrated in FIGS. 6A to 6C, each of the shapes representing the correction status is displayed in a manner divided into a central portion and a peripheral portion. It can be understood from the shapes representing the correction status illustrated in FIGS. 6B and 6C that more distortion remains in the peripheral portion than in the central portion.

Figures 7A, 7B, 7C:
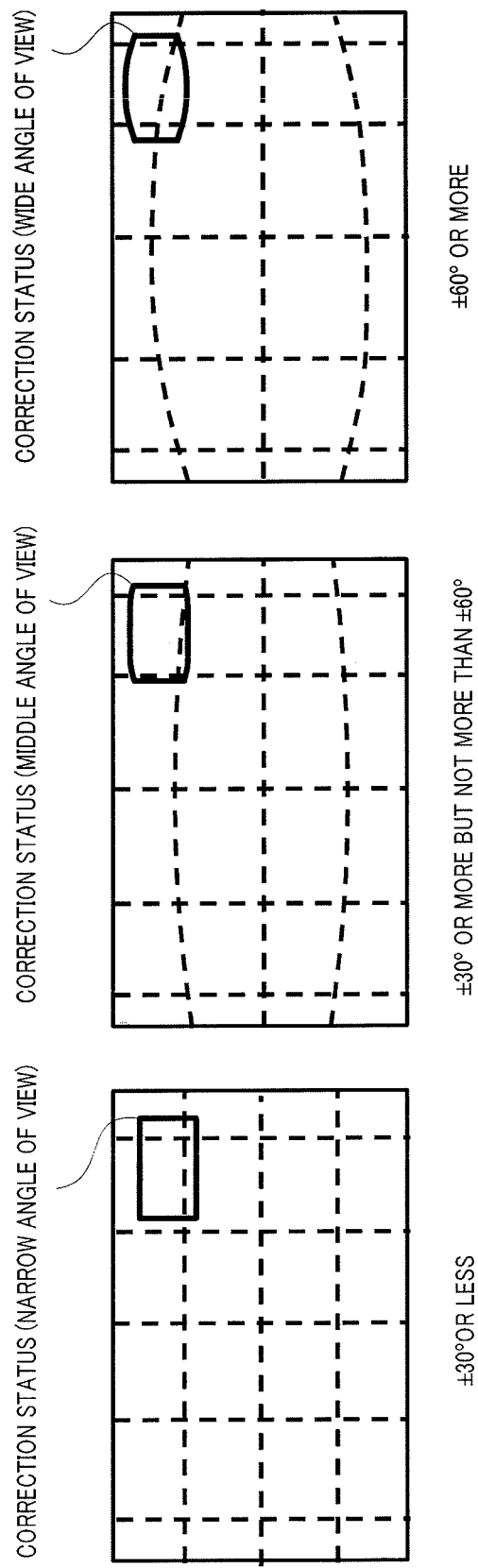
FIGS. 7A to 7C are diagrams illustrating other display examples of a shape with correction status and correction results.

FIGS. 7A to 7C illustrate examples where the shapes representing the correction statuses of the peripheral portions illustrated in FIGS. 6A to 6C are displayed on the upper right portions of the display images, respectively. In addition, the shapes representing the respective correction statuses are displayed as examples as in in FIGS. 6A to 6C and FIGS. 7A to 7C. However, the correction factors may be displayed without displaying the shapes.

The image outputted from correction status superimposition section 105 is displayed on a display section (not illustrated).

As described hereinabove, according to the present embodiment, not only the electronic zooming process but also correction factor S4 of the distortion correction process is changed in accordance with designated electronic zoom magnification ratio S1. Thus, it is made possible to appropriately correct a distorted image while preventing the image from becoming unnatural. More specifically, the smaller the designated electronic zoom magnification ratio S1 is, in other words, the larger the electronic zoom angle of view (wide-angle image) is, the more amount of unnatural appearance caused by extreme magnification of the peripheral portion can be suppressed by reducing the correction factor S4. Namely, it is possible to obtain an easily viewable (more convincing) image at the angle of view corresponding to each electronic zoom magnification ratio.

In addition, the distortion correction process according to the embodiment may be described as a process of performing correction so as to form equi-angle (equidistance projection) during electronic zooming at a wide angle of view, while performing correction so as to form a straight line (perspective projection) during electronic zooming at a narrow angle of view and performing correction so as to smoothly change equi-angle to a straight line during electronic zooming at a middle angle of view.

In addition to the above-described embodiment, in electronic zoom and distortion correction processing section 104, the distortion correction may be controlled independently in the horizontal and vertical directions. For example, distortion correction of a vertical straight line in the vertical direction is performed so as to form a straight line irrespective of electronic zoom magnification ratio (or may be expressed as electronic zoom angle of view) S1, and distortion correction of a horizontal straight line is performed in a way that allows some curve according to electronic zoom magnification ratio S1. Thus, a more natural-looking image can be obtained. This is because, with respect to an object such as a tree or a man standing vertically, a natural image can be obtained by completely correcting a distorted line in the vertical direction, that is, by correcting the distorted line in the vertical direction so as to be a vertical straight line.

In addition, although the embodiment has been described with a case where electronic zoom and distortion correction processing section 104, remapping control section 110, and correction status superimposition section 105 are provided in the camera, these sections may be provided as distortion correction apparatuses separately from the camera.

In addition, the configuration of remapping control section 110 is not limited to the configuration illustrated in FIG. 2. For example, in a case where wide-angle lens 101 has a constant lens angle of view, correction factor S4 and read address S5 can be generated by using designated electronic zoom magnification ratio S1 without calculation. Thus, zoom-angle-of-view calculation section 111 may be omitted in this case.

The disclosure of Japanese Patent Application No. 2011-001125, filed on Jan. 6, 2011, including the specification, drawings and abstract, is incorporated herein by reference in its entirety.

INDUSTRIAL APPLICABILITY

The present invention is suitable for use in performing both of an electronic zooming process and a distortion correction process on a distorted image captured by using a wide-angle lens such as a fisheye lens.

REFERENCE SIGNS LIST

100 Camera
101 Wide-angle lens
104 Electronic zoom and distortion correction processing section
105 Correction status superimposition section
110 Remapping control section
111 Zoom-angle-of-view calculation section
112 Read address generation section
113 Correction factor determination section
S1 Electronic zoom magnification ratio
S2 Lens angle of view
S3 Electronic zoom angle of view
S4 Correction factor
S5 Read address

The invention claimed is:

1. A camera comprising:
a lens that forms an image of a subject;
an imaging sensor that acquires a captured image signal by converting an optical image formed by the lens into an electrical signal;
an electronic zoom and distortion correction processor that performs an electronic zooming process on the captured image signal in accordance with a user-designated electronic zoom magnification ratio and a distortion correction process on the captured image signal in accordance with an adjustable correction factor; and
a zoom-angle-of-view calculator that calculates an electronic zoom angle of view based on the user-designated electronic zoom magnification ratio and an angle of view of the lens, wherein
the correction factor is adjusted in accordance with the user-designated electronic zoom magnification ratio, and wherein
the electronic zoom and distortion correction processor changes the correction factor of the distortion correction process in accordance with the electronic zoom angle of view calculated by the zoom-angle-of-view calculator,
wherein a value of the correction factor of distortion correction of a straight vertical line is greater than a value of the correction factor of distortion correction of a straight horizontal line which is changed in accordance with the user-designated electronic zoom magnification ratio.

2. The camera according to claim 1, wherein the electronic zoom and distortion correction processor further changes the correction factor of the distortion correction process in accordance with the angle of view of the lens.

3. The camera according to claim 1, further comprising a correction status superimposer that superimposes a distortion correction status based on the correction factor on the image on which the electronic zooming process and the distortion correction process have been performed.

4. The camera according to claim 1, wherein the correction factor is independently controlled in horizontal and vertical directions.

5. The camera according to claim 1, wherein the value of the correction factor of distortion correction of the straight vertical line is 100%.

6. The camera according to claim 1, wherein the angle of view of the lens is user-designated.

7. The camera according to claim 1, wherein the value of the correction factor of distortion correction of the straight vertical line is fixed.

8. The camera according to claim 1, wherein the value of the correction factor of distortion correction of the straight horizontal line is changed to allow curvature, in accordance with the user-designated electronic zoom magnification ratio.

9. The camera according to claim 1, wherein the electronic zoom angle of view is a degree value.

10. A distortion correction apparatus associated with a camera and a lens, comprising:
- an electronic zoom and distortion correction processor that performs an electronic zooming process on a distorted image in accordance with a user-designated electronic zoom magnification ratio and an angle of view of the lens, and a distortion correction process on the distorted image by remapping pixels of the distorted image in accordance with an adjustable correction factor; and
- a remapping controller that controls the remapping performed by the electronic zoom and distortion correction processor such that the correction factor is adjusted in accordance with the user-designated electronic zoom magnification ratio and the angle of view of the lens,
- wherein a value of the correction factor of distortion correction of a straight vertical line is greater than a value of the correction factor of distortion correction of a straight horizontal line which is changed in accordance with the user-designated electronic zoom magnification ratio.

11. The distortion correction apparatus according to claim 10, wherein the angle of view of the lens is user-designated.

12. The camera according to claim 10, wherein an electronic zoom angle of view comprising a degree value is calculated based on the user-designated electronic zoom magnification ratio and the angle of view of the lens.

13. A distortion correction method associated with a camera and a lens, comprising:
- performing an electronic zooming process and a distortion correction process on a distorted image by remapping pixels of the distorted image in accordance with a user-designated electronic zoom magnification ratio;
- calculating an electronic zoom angle of view based on the user-designated electronic zoom magnification ratio and an angle of view of the lens; and
- controlling the remapping by adjusting a correction factor in accordance with the user-designated electronic zoom magnification ratio,
- wherein the electronic zoom and distortion correction process changes the correction factor of the distortion correction process in accordance with the calculated electronic zoom angle of view,
- wherein a value of the correction factor of distortion correction of a straight vertical line is greater than a value of the correction factor of distortion correction of a straight horizontal line which is changed in accordance with the user-designated electronic zoom magnification ratio.

14. The method according to claim 13, wherein the electronic zoom and distortion correction process further changes the correction factor of the distortion correction process in accordance with the angle of view of the lens.

15. The method according to claim 13, further comprising superimposing a distortion correction status based on the correction factor on the image on which the electronic zooming process and the distortion correction process have been performed.

16. The method according to claim 13, wherein the correction factor is controlled independently in horizontal and vertical directions.

17. The method according to claim 13, wherein the value of the correction factor of distortion correction of the straight vertical line is 100%.

18. The method according to claim 13, wherein the angle of view of the lens is user-designated.

19. The camera according to claim 13, wherein the electronic zoom angle of view is a degree value.

* * * * *